(12) United States Patent
Cusumano et al.

(10) Patent No.: US 7,069,893 B2
(45) Date of Patent: Jul. 4, 2006

(54) AIR INTAKE SYSTEM

(75) Inventors: Thomas Cusumano, Birmingham, MI (US); Craig Smith, Lake Orion, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/868,308

(22) Filed: Jun. 14, 2004

(65) Prior Publication Data

US 2005/0274347 A1 Dec. 15, 2005

(51) Int. Cl.
*F02M 35/10* (2006.01)

(52) U.S. Cl. ............... 123/184.2; 123/198 E; 55/385.3

(58) Field of Classification Search ............ 123/184.2, 123/198 E; 55/385.3, 320, 418, 419, 423
See application file for complete search history.

(56) References Cited

U.S. PATENT DOCUMENTS

| | | | |
|---|---|---|---|
| 4,212,659 A | 7/1980 | Magrini | |
| 4,699,639 A | 10/1987 | Gieseke et al. | |
| 5,034,036 A | 7/1991 | Creek et al. | |
| 5,755,842 A * | 5/1998 | Patel et al. | 55/330 |
| 6,368,386 B1 | 4/2002 | Nelson et al. | |
| 6,422,197 B1 * | 7/2002 | Amann et al. | 123/198 E |
| 6,423,108 B1 * | 7/2002 | Mueller | 55/385.3 |
| 6,485,854 B1 | 11/2002 | Grover et al. | |
| 6,497,971 B1 | 12/2002 | Reiser | |
| 6,521,008 B1 * | 2/2003 | Lenzing et al. | 55/385.3 |
| 6,551,389 B1 * | 4/2003 | Spannbauer et al. | 96/380 |
| 6,638,339 B1 | 10/2003 | Dallas et al. | |
| 2004/0031248 A1 * | 2/2004 | Lindsay | 55/385.3 |

* cited by examiner

*Primary Examiner*—John T. Kwon
(74) *Attorney, Agent, or Firm*—Tung & Associates; Damian Porcari

(57) ABSTRACT

A novel air intake system which is suitable for at least substantially reducing the inadvertent intake of water with ambient air into an air compressor or other operational component of a fuel cell or internal combustion engine is disclosed. The air intake system typically includes an elongated air flow conduit having a downwardly-angled air inlet arm that is typically fitted with multiple louver elements and a splash shield to deflect entering water downwardly into a drain or gullet chamber. The air intake system typically further includes a mechanism for gravity-mediated draining of water from the air flow conduit to prevent entering water from being drawn into the air compressor or other component.

9 Claims, 2 Drawing Sheets

AIR INTAKE SYSTEM

FIELD OF THE INVENTION

The present invention relates generally to air intake systems which conduct air from outside a vehicle to an engine or other operational components of the vehicle. More particularly, the present invention relates to a novel side-air intake system which includes multiple components that are designed to prevent or minimize entry of water into an air compressor of a fuel cell electric vehicle or into an internal combustion engine of a vehicle as air is drawn from outside the vehicle into the air compressor or engine.

BACKGROUND OF THE INVENTION

Fuel cell technology has been identified as a potential alternative for the traditional internal-combustion engine conventionally used to power automobiles. It has been found that power cell plants are capable of achieving efficiencies as high as 55%, as compared to maximum efficiency of about 30% for internal combustion engines. Furthermore, fuel cell power plants produce zero tailpipe emissions and produce only heat and water as by-products.

Generally, oxygen is required in fuel cells to generate electricity. For example, in fuel cells constructed with a Proton Exchange Membrane, hydrogen fuel flows into one electrode which is coated with a catalyst that strips the hydrogen into electrons and protons. Protons pass through the PEM to the other electrode. Electrons cannot pass through the PEM and must travel through an external circuit, thereby producing electricity, which drives an electric motor that powers the automobile. Oxygen flows into the other electrode, where it combines with the hydrogen to produce water vapor, which is emitted from the tailpipe of the vehicle. Individual fuel cells can be stacked together in series to generate increasingly larger quantities of electricity.

Accordingly, hydrogen fuel cell-powered vehicles require a source of ambient air for the oxygen necessary to generate electrical power. During vehicle operation, ambient air is drawn through an inlet grille which is typically provided on the driver's side, lower-rear quarter panel of the vehicle. The ambient air is fed to a positive displacement air compressor, which is susceptible to liquid water that may be inadvertently drawn in with the ambient air.

Accordingly, a novel air intake system is needed which is capable of at least substantially reducing the intake of water with ambient air into an air compressor or other component of a fuel cell or internal combustion engine.

SUMMARY OF THE INVENTION

The present invention is generally directed to a novel air intake system which is suitable for at least substantially reducing the intake of water with ambient air into an air compressor or other operational component of a fuel cell or internal combustion engine. The air intake system includes a combination of multiple devices which are situated in an elongated air flow conduit to at least substantially reduce the progress of water into the operational component or components of the vehicle. The devices include an air inlet arm which is fitted with angled grill louvers to hinder the entry of water into the air flow conduit, a splash shield provided in the air inlet arm to divert from the air flow conduit water that passes beyond the grill louvers, backflow surfaces provided in the air inlet arm to facilitate the drainage of water from the air inlet arm, a vertical "head height" between the air inlet arm and a transverse segment of the air flow conduit to prevent or reduce further flow of water through the air flow conduit by gravity, a gullet chamber situated beneath the air intake arm for collecting the diverted water, and a standard air filter which absorbs any water which reaches it and is eventually dried through normal operation.

BRIEF DESCRIPTION OF THE DRAWINGS

The invention will now be described, by way of example, with reference to the accompanying drawings, in which.

DETAILED DESCRIPTION OF THE INVENTION

The present invention contemplates a novel air intake system which is particularly adapted for use in a fuel cell electric vehicle to at least minimize the ingress of water with ambient air into a positive displacement air compressor which delivers compressed ambient air as an oxygen source to an electricity-generating fuel cell or cells. However, the air intake system of the present invention is equally adaptable to internal combustion engines and other systems in which air is to be delivered to a destination in a substantially water-free state.

Figure 1:
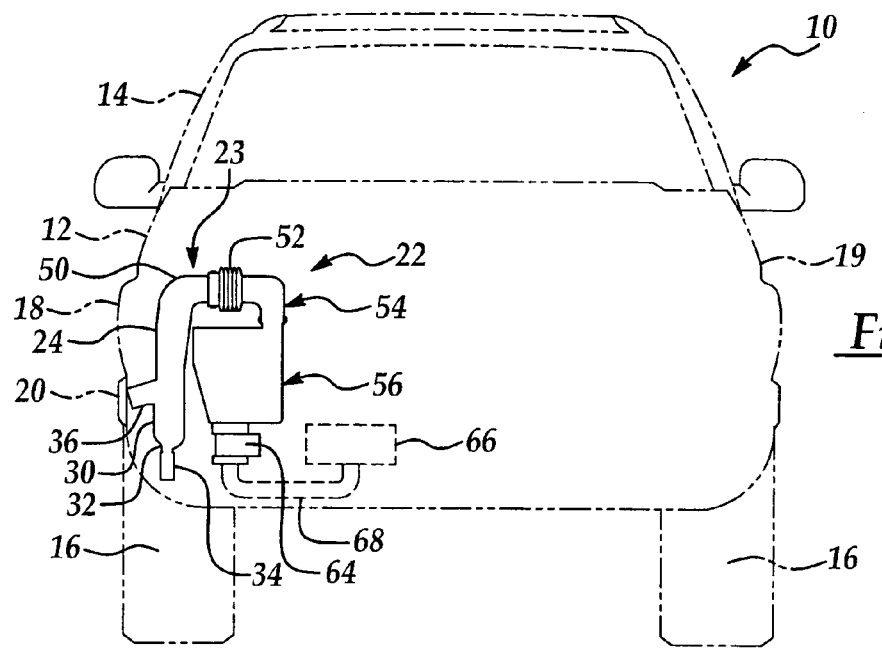
FIG. 1 is a rear, partially schematic view of an illustrative fuel cell electric vehicle (shown in phantom), more particularly illustrating a typical position of the packaged air intake system (shown in solid lines) of the present invention in the vehicle.

Referring initially to FIG. 1, an illustrative fuel cell electric vehicle 10 is indicated in phantom in rear view. The fuel cell electric vehicle 10 typically includes a chassis 12 and a cabin 14. The vehicle 10 typically includes four wheels, including a pair of spaced-apart rear wheels 16. The chassis 12 typically includes a rear left quarter panel 18, a rear right quarter panel 19, a front left quarter panel (not shown) and a front right quarter panel (not shown).

An air intake system 22 according to the present invention is shown by solid lines in a typical packaged configuration in the fuel cell electric vehicle 10. The air intake system 22 includes an elongated air flow conduit 23, which includes an ascending air intake segment 24 having an air inlet arm 36; a gullet chamber 30 extending beneath the air inlet arm 36; a transverse segment 50 which extends generally horizontally from the air intake segment 24 and may be connected to a descending segment 54 via a flexible connector 52; and a filter housing 56 which is provided at the outlet end of the descending segment 54 and has a clean air outlet 64. Preferably, the gullet chamber 30 has a water-holding capacity of at least typically about 24 oz. In the fuel cell electric vehicle 10, the clean air outlet 64 is connected, either directly or through a connector hose 68, to a positive displacement air compressor 66. The air compressor 66 delivers ambient air as an oxygen source to a fuel cell or cells (not shown), which use the oxygen to generate electricity to drive the fuel cell electric vehicle 10, as is known by those skilled in the art.

As further shown in FIG. 1, an air inlet grille 20 is provided typically on the rear left quarter panel 18 of the chassis 12. The air inlet arm 36 of the air intake system 22 is positioned behind the air inlet grille 20. Accordingly, in normal operation of the fuel cell electric vehicle 10, as hereinafter further described in detail, air is drawn through the air inlet grille 20, air inlet arm 36 and air flow conduit 23, respectively, and is filtered in the filter housing 56 prior to being distributed to the air compressor 66.

Figure 2:
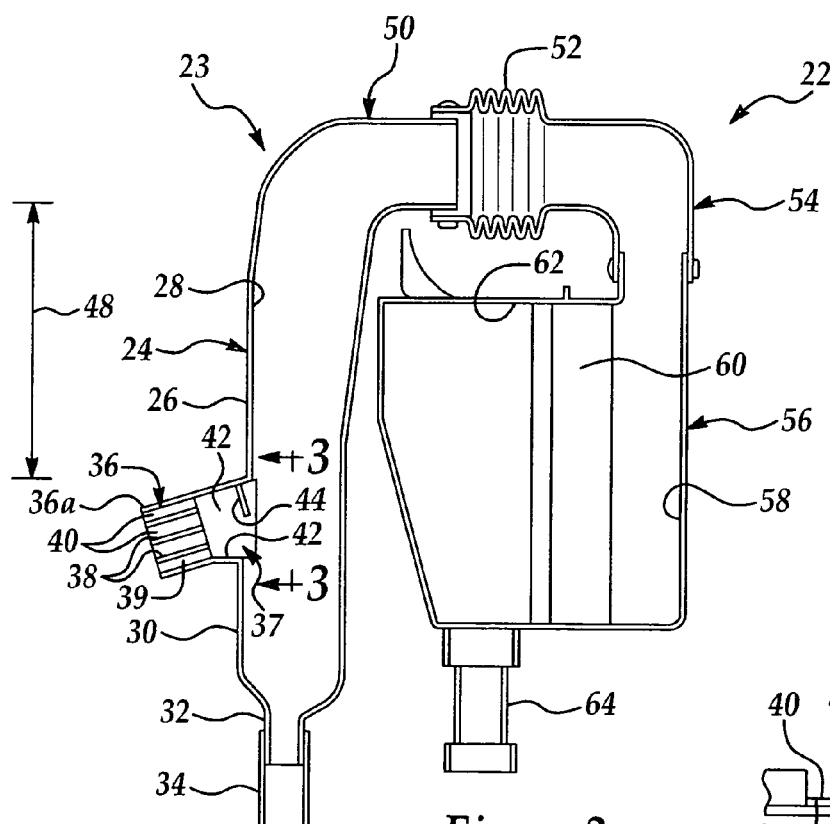
FIG. 2 is a longitudinal sectional view of an illustrative embodiment of the air intake system of the present invention.
Figure 3:
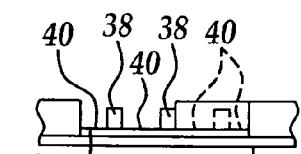
FIG. 3 is a sectional view, taken along section lines 3—3 in FIG. 2.

Referring next to FIG. 2, a longitudinal sectional view of the air intake system 22 is shown. The air inlet arm 36 includes multiple, elongated, parallel grill louvers 38 which extend inwardly from the wall 36a of the air inlet arm 36, as shown in the cross-section of FIG. 3. Air flow passages 40 are defined between and separated from each other by the grill louvers 38. As further shown in FIG. 2, the air inlet arm 36 extends at a downward angle from the vertical air intake segment 24. Accordingly, because the grill louvers 38 extend generally parallel to the longitudinal axis of the air inlet arm 36, the spaced-apart grill louvers 38 are disposed at a downward angle with respect to the air intake segment 24. Therefore, as hereinafter further described, the downwardly-angled grill louvers 38 provide a first barrier to ingress of water to the air compressor 66 (FIG. 1) and/or other operational components of the vehicle 10 as air is drawn into the air flow conduit 23 through the air inlet arm 36.

As further shown in FIG. 2, a splash shield 44 extends downwardly from the upper portion of the wall 36a of the air inlet arm 36, into the air inlet arm 36. The splash shield 44 is disposed in spaced-apart relationship to the downstream or outlet end of the air flow spaces 40 and partially blocks an opening 37 which establishes fluid communication between the air inlet arm 36 and the air intake segment 24. Furthermore, the splash shield 44 is typically positioned in generally perpendicular relationship to the direction of flow of air through the air inlet arm 36. The splash shield 44 provides a second barrier to the ingress of water into the air compressor 66 as air is drawn through the air intake system 22.

The bottom and side interior surfaces of the air inlet arm 36 define backflow surfaces 42 at the downstream or outlet end of the air flow spaces 40. The backflow surfaces 42 define a gap distance between the outlet end of the air flow spaces 40 and the opening 37 between the air inlet arm 36 and the interior 28 of the air intake segment 24. Accordingly, in the event that water inadvertently enters the air inlet arm 36 and collects in the descending gullet chamber 30, the backflow surfaces 42 prevent "water lock" by facilitating the drainage of water from the gullet chamber 30 and out the air inlet arm 36, through the air flow spaces 40. Therefore, the backflow surfaces 42 provide a third barrier to the ingress of water to the filter housing 56 and beyond.

As shown in FIG. 2, the air intake segment 24 of the air flow conduit 23 includes a generally cylindrical wall 26 which defines an interior 28 to accommodate upward vertical airflow. The air intake segment 24 ascends from the opening 37 at the outlet end of the air inlet arm 36, to the transverse segment 50 of the air flow conduit 23. Accordingly, the longitudinal extent of the air intake segment 24 defines a head height 48, through which air (and water) must travel to reach the transverse segment 50. The head height 48 of the air intake segment 24 utilizes gravity, or negative head pressure, to pull most of the water which inadvertently enters the interior 28 of the air intake segment 24, downwardly into the gullet chamber 30. Thus, the head height 48 of the air intake segment 24 provides a fourth barrier to ingress of water beyond the air intake system 22.

A tapered drain 32 is provided in the bottom of the gullet chamber 30. A drain conduit 34 may extend from the bottom end of the drain 32. As shown in FIG. 1, the open-ended drain conduit 34 may terminate at the bottom of the chassis 12 of the vehicle 10 to drain water from the gullet chamber 30 and onto the pavement (not shown). Alternatively, a collection receptacle (not shown) may be provided at the bottom end of the drain conduit 34 to collect water as it is drained from the gullet chamber 30, in which case the collection receptacle may be periodically emptied. The drain 32 provides a fifth barrier to ingress of water beyond the air intake system 22.

As shown in FIG. 2, the filter housing 56 is provided at the downstream or outlet end of the descending segment 54 of the air flow conduit 23. The filter housing 56 includes a pre-filtered air chamber 58, a standard air filter 60 and a clean air chamber 62. The clean air outlet 64 extends downwardly from the clean air chamber 62 of the filter housing 56.

It will be appreciated by those skilled in the art that any water which remains in the air flowing through the air flow conduit 23, beyond the descending segment 54 must pass through the filter 60, which removes most or all of the remaining water from the flowing air. During the course of normal operation, the air flowing through the air filter 60 will dry the water trapped therein. Therefore, the air filter 60 provides a sixth barrier to the ingress of water beyond the air intake system 22 to the air compressor 66.

Figure 4:
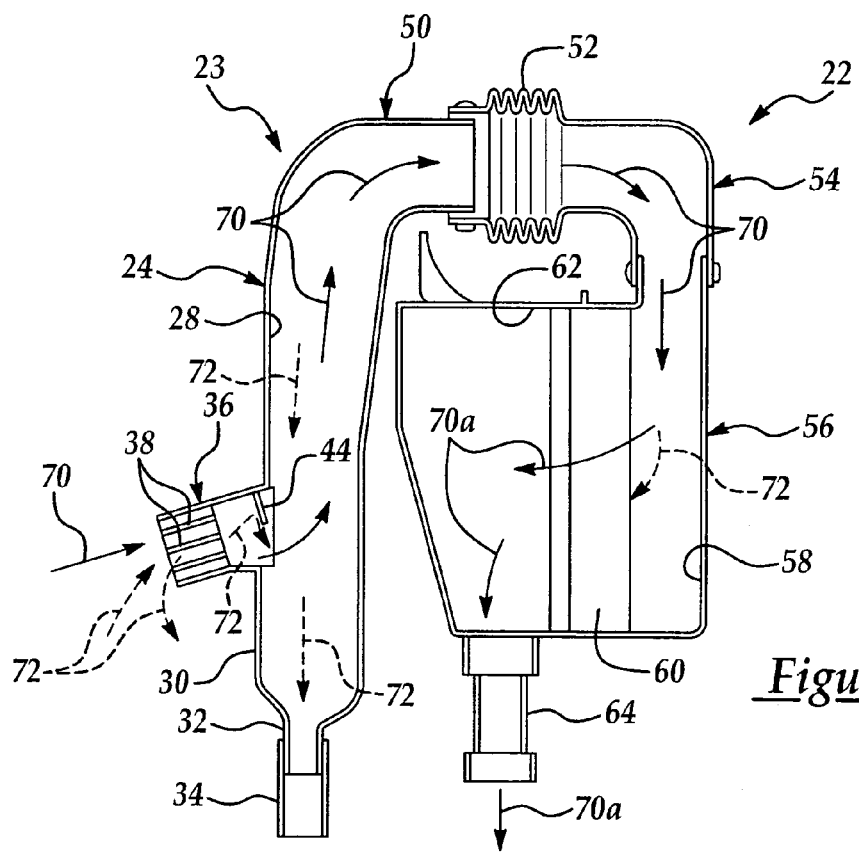
FIG. 4 is a longitudinal sectional view of the air intake system of the present invention shown in FIG. 2, illustrating flow of air (solid arrows) through the system and blockage or deflection of water (dashed arrows) through the system during operation thereof.
Figure 5:
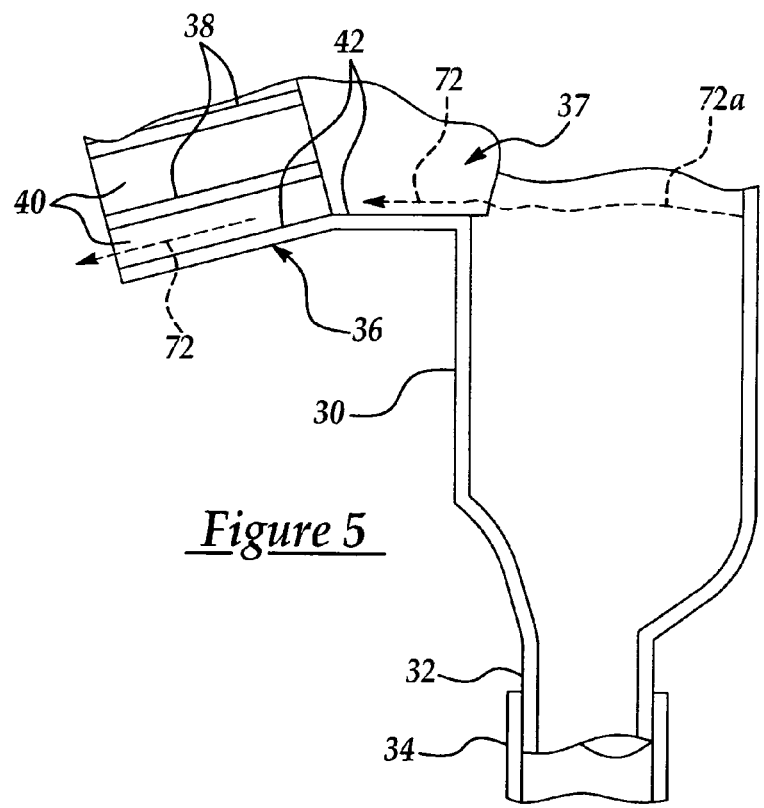
FIG. 5 is an enlarged, longitudinal sectional view of the gullet chamber element of the air intake system of the present invention, more particularly illustrating drainage of accumulated water from the gullet chamber through the air inlet arm in the event of water accumulation in the gullet chamber.

Referring next to FIGS. 4 and 5, in operation of the air intake system 22, pre-filtered ambient air 70 is drawn through the air inlet grille 20 (FIG. 1) of the vehicle 10, into the air inlet arm 36; through the air intake segment 24, transverse segment 50 and descending segment 54, respectively, of the air flow conduit 23; and through the filter 60 in the filter housing 56, where dust, dirt and other particulate material is removed from the pre-filtered air 70. Filtered air 70a emerges from the air filter 60 and flows from the clean air chamber 62 through the clean air outlet 64, and finally, is distributed to the air compressor 66.

As further shown in FIG. 4, during operation of the air intake system 22, water 72 may be inadvertently splashed through or otherwise enter the air inlet grille 20 (FIG. 1) and enter the air inlet arm 36 with the pre-filtered air 70. Accordingly, the multiple, parallel grill louvers 38 in the air inlet arm 36 act as a first barrier to the progression of the water 72 beyond the air intake system 22. The grill louvers 38 therefore deflect much of the splashed water 72 back out of the air inlet arm 36 and through the air inlet grille 20.

In the event that some of the water 72 progresses through the air flow spaces 40 and beyond the grill louvers 38 inside the air inlet arm 36, the splash shield 44 in the air inlet arm 36 deflects much or all of the water 72 downwardly into the gullet chamber 30. The water 72 is drained from the drain 32 and through the drain conduit 34. In the event that some of the water 72 progresses beyond the splash shield 44 and into the interior 28 of the air intake segment 24, gravity pulls most or all of the water 72 downwardly into the gullet chamber 30 and out the drain 32 and drain conduit 34, due to the head height 48 (FIG. 2) of the air intake segment 24.

As shown in FIG. 5, under some circumstances the drain 32 and/or drain conduit 34 may become plugged or blocked with debris (not shown). In that case, water 72 deflected by the splash shield 44 and pulled by gravity from the air intake segment 24 may accumulate in the gullet chamber 30. Accordingly, when the accumulated water 72a reaches the level of the opening 37 at the air inlet arm 36, the water 72 flows down the interior backflow surfaces 42 of the air inlet arm 36, through the air flow spaces 40 and out of the air inlet arm 36.

As the pre-filtered air 70 flows through the air flow conduit 23, some small droplets of the water 70 may be carried by the flowing pre-filtered air 70 upwardly through the air intake segment 24, horizontally through the transverse segment 50 and downwardly into the filter housing 56 through the descending segment 54. Accordingly, the pre-filtered air 70 carries the water 72 through the air filter 60, which removes most or all of the remaining water 72 from the pre-filtered air 70. Therefore, the filtered air 70a emerges from the air filter 60 and enters the clean air chamber 62 in a substantially dry, water-free state. Accordingly, water is substantially incapable of entering and interfering with operation of the air compressor 66 and/or other operational components of the vehicle 1.

While the preferred embodiments of the invention have been described above, it will be recognized and understood that various modifications can be made in the invention and the appended claims are intended to cover all such modifications which may fall within the spirit and scope of the invention.

What is claimed is:

1. An air intake system comprising:
   an elongated air flow conduit;
   an air inlet arm provided in fluid communication with said air flow conduit;
   a plurality of louver elements provided in said air inlet arm and defining a plurality of air flow spaces;
   a splash shield extending into said air inlet arm for deflecting water from said air flow conduit; and
   a filter housing having a filter provided in fluid communication with said air flow conduit.

2. The air intake system of claim 1 further comprising a gap distance provided in said air inlet arm between said plurality of louver elements and said air flow conduit and backflow surfaces spanning said gap distance for facilitating flow of water from said air inlet arm.

3. The air intake system of claim 1 further comprising a gullet chamber extending downwardly from said air flow conduit beneath said air inlet arm and a drain provided in said gullet chamber.

4. The air intake system of claim 3 further comprising a gap distance provided in said air inlet arm between said plurality of louver elements and said air flow conduit and backflow surfaces spanning said gap distance for facilitating flow of water from said air inlet arm.

5. The air intake system of claim 1 wherein said air flow conduit comprises a vertical air intake segment provided in fluid communication with said air inlet arm, a transverse segment extending generally horizontally from said air intake segment and a descending segment extending generally downwardly from said transverse segment.

6. The air intake system of claim 5 further comprising a gap distance provided in said air inlet arm between said plurality of louver elements and said air flow conduit and backflow surfaces spanning said gap distance for facilitating flow of water from said air inlet arm.

7. The air intake system of claim 5 further comprising a gullet chamber extending downwardly from said air intake segment beneath said air inlet arm and a drain provided in said gullet chamber.

8. The air intake system of claim 7 further comprising a gap distance provided in said air inlet arm between said plurality of louver elements and said air flow conduit and backflow surfaces spanning said gap distance for facilitating flow of water from said air inlet arm.

9. An air intake system comprising:
   an elongated air flow conduit having a generally vertical air intake segment;
   an air inlet arm provided in fluid communication with said air intake segment, said air inlet arm extending generally downwardly at an angle with respect to said air intake segment;
   a plurality of grille louvers provided in said air inlet arm and defining a plurality of air flow spaces;
   a splash shield extending into said air inlet arm for deflecting water from said air flow conduit; and
   a filter housing having a filter provided in fluid communication with said air flow conduit.

* * * * *